Dec. 18, 1962 P. RENAUT 3,069,574
PIEZOELECTRIC TRANSDUCER
Filed Dec. 2, 1958

United States Patent Office 3,069,574
Patented Dec. 18, 1962

3,069,574
PIEZOELECTRIC TRANSDUCER
Paul Renaut, Saint Maur, France, assignor to Realisations Ultrasoniques, a corporation of France
Filed Dec. 2, 1958, Ser. No. 777,754
Claims priority, application France Dec. 4, 1957
10 Claims. (Cl. 310—9.7)

The present invention relates to transducers, and more particularly to piezoelectric transducers, adapted to be used for producing pressure waves from electric energy, and vice-versa.

Transducers generally used for testing materials by means of sound or ultrasonic pulses are in the shape of comparatively flat discs or plates which are placed flat on the material to be inspected and transmit longitudinal vibrations thereto.

An electric pulse applied to the transducer will then produce a train of damped pressure wave pulses propagating in the material to be inspected. The arrangement must be such that the first "echo" is received by the transducer after the end of its damping period, this occurrence being based on the assumption that the thickness of the material is substantially large. This will result in an unfavourable restriction in the use of this type of transducers and in the necessity of causing such transducers to be damped as much as possible.

To this end, a thick coating of pressure wave energy absorbing substance is applied, for instance, on that face of the disc which is not engaged with the material to be probed. The resulting damping effect is however unsufficient, this being mainly due to the fact that, in order to apply electric pulses to the transducer, it is first necessary to metallize its two surfaces; a metallization is therefore interposed between the mass of damping substance and the piezoelectric disc; the metallized face will then reflect part of the energy, resulting in a substantial decrease of the damping action.

In the U.S. patent application Serial No. 622,415 a testing method has been disclosed, using a transducer the thickness of which is much greater than that of the above mentioned discs or plates. According to this method, the thick transducer is energized by means of short electric pulses, the arrangement being such that the transducer receives the echoes between two successive pulses of the damped pulse train generated by each one of said energizing pulses.

Under these circumstances, it is unpractical to apply an energizing electric field between two metallized layers deposited on the surfaces of the transducer: the face in contact with the examined material is generally unable to carry such a metallized layer, since it would wear out through frictional action with the probed material, and said metallized surface cannot be protected, on the other hand, by an intermediate coating, as the latter would introduce stray reflections, which are particularly detrimental in such methods. Besides, in order to space out as much as possible the successive damped pulses, it is desirable to eliminate the ultrasonic pulses derived from one of said two faces, and consequently to metallize one face only.

Finally, in such transducers, the energizing electric field is generally applied between a first metallized layer carried by that face of the transducers which is not engaged with the material to be probed, and a second peripheral metallized layer located at a comparatively short distance from the first layer: the resulting electric field distribution is however unfavourable, and might give rise besides of the desired longitudinal vibrations, to parasitic transversal oscillating waves, which, in any case, would substantially reduce the sensitivity of the transducer.

It is an object of the present invention to provide a piezoelectric transducer device, which will not show the above mentioned disadvantages.

A piezoelectric transducer device according to the invention comprises one or a plurality of electrically conductive grids embedded in the piezoelectric material of the device.

The invention will be best understood from the following description and appended drawing, wherein.

Figure 1:
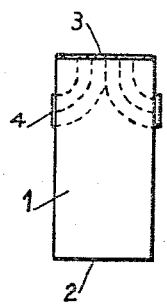
FIG. 1 shows a transducer of substantial thickness, of the type used in the U.S. patent application mentioned above.

Referring to the drawing, the reference numeral 1 denotes the piezoelectric material, for instance, a ceramic material; 2 denotes the face of the transducer which is engaged with the material to be probed, and 3 the opposite face of the transducer.

In the transducer device illustrated in FIG. 1 and according to the indications specified in the above mentioned U.S. patent application, face 3 is metallized and the energizing electric signal is applied the metallization across face 3 and a peripheral annular metallized layer located at a small distance away from face 3. It is remarked that face 2 is not metallized, and therefore the disadvantages mentioned herein above are avoided.

The lines of force of the electric energizing field, shown in dotted lines, indicate that the distribution of the field is not homogeneous, resulting in the above mentioned disadvantages.

Figure 2:
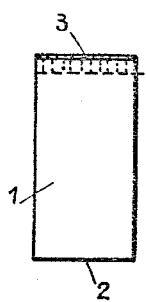
FIGS. 2 to 4 illustrate transducers provided with grids embodying the present invention.
Figure 3:
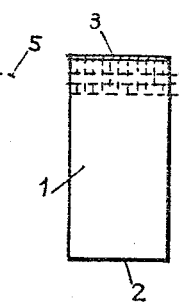

In FIGS. 2 and 3, face 3 is metallized as shown in FIG. 1, but the second metallized surface is replaced by a metal grid 5, and the energizing field, applied across said grid and the metallized layer 3, has a homogeneous distribution of its lines of force, resulting in a considerably improved responsiveness of the transducer.

Grid 5 is, for instance, made of a platinum wire 1 mm. in diameter, its meshes having a side .2 to .3 mm. long, these values being in no way limitative. Under these conditions, reflection of the ultrasonic waves on the grids is negligible.

According to the invention, it is possible to apply on grid 5 not only the energizing electric signal, but also a direct current polarization voltage. It may be desirable, for certain applications, to use ceramic material having no remanent polarization—since such ceramic materials may show better piezoelectric properties—in this case, a polarization voltage must be applied to these ceramics during their operation, but this voltage should be the higher as the thickness of the ceramic which is to be polarized is larger: in the transducer according to the invention, it is possible to use a comparatively low polarization voltage, since polarization is applied only to a 1 mm. thick region which is, for instance located between grid 5 and metallizer layer 3.

FIG. 3 shows two additional grids 6 and 7. On one of the grids 5, 6, 7 there will be applied an electric energizing electric signal, on another one the polarization, and on the third one the echoes.

Figure 4:
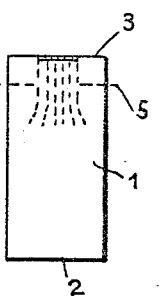

Although reflection of the elastic vibrations on the grid is small, it may be however further reduced, provided that if the dimensions of the meshes and the diameter of the wire which form the grid be suitably selected, and that grid 5 and metallized face 3 be given the shape which is shown in FIG. 4.

Figure 5:
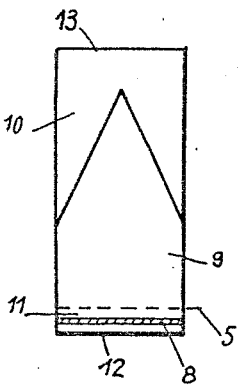
FIG. 5 illustrates a piezoelectric transducer device of smaller thickness, provided with a grid embodying the present invention.

In FIG. 5, there is shown a transducer device comprising a thin portion of piezoelectric material 11. Face 13 of said transducer, opposite the end in contact with the material to be probed, is not metallized, whereas the contact and carries a metallized layer 8, coated with a protecting film 12 of polyvinyl chloride, for instance. The energization electric signal is applied between the conductive grid 5 and the metallized layer 8 and, above grid 5 there is located a ceramic block 9 which has the function of a damper and need not show piezoelectric properties: since grid 5 introduces but little reflection and the material out of which the transducer is made is substantially homogeneous when passing from zone 11 to zone 9, the damping obtained is as complete as possible.

In the non limitative example illustrated, the damping is completed by a block 10 of an ultrasounds absorbing substance, such as the material known under the trade name "Araldite" for instance, shaped as shown on FIGURE 5 in view of obtaining an optimum damping.

What is claimed is:

1. A piezoelectric transducer device adapted to produce longitudinal vibrations, comprising an elongated homogeneous body including along its length first and second portions joining at a transverse interface, the dimension of said first portion parallel to said length being substantially shorter than the corresponding dimension of said second portion, at least said first portion being made of a substance having piezoelectric properties and being polarized in a direction substantially parallel to said length; at least one conductive grid being embedded in said homogeneous body at said interface and at least another electrode in contact with said body.

2. A longitudinally-responsive piezoelectric transducer device comprising an elongated homogeneous body having first and second longitudinal portions joining at a plane interface, the longitudinal dimension of said first portion being substantially shorter than that of said second portion, at least said first portion being made of a substance having piezoelectric properties and being longitudinally polarized; at least one conductive grid being embedded in said homogeneous body at said interface and at least another electrode in contact with said body.

3. A longitudinally-responsive piezoelectric transducer device comprising a cylindrical ceramic rod including a first longitudinal portion and a second longitudinal portion substantially longer than said first portion; an electrically conductive grid located at the interface between said two portions and at least another electrode in contact with said rod; said first portion being made of a piezoelectric ceramic substance and longitudinally polarized, and said second portion being made of a non-polarized ceramic substance.

4. A longitudinally-responsive piezoelectric transducer device comprising a cylindrical ceramic rod including a first longitudinal portion and a second longitudinal portion substantially longer than said first portion; an electrically conductive grid located at the interface between said two portions; said first portion being made of a piezoelectric ceramic substance and longitudinally polarized, and said second portion being made of a non-polarized ceramic substance; said first portion having a metallized end opposite to said grid and substantially parallel thereto.

5. A piezoelectric transducer device adapted to produce longitudinal vibrations, comprising a homogeneous elongated body including along its length first and second portions joining at a transverse interface, the dimension of said first portion parallel to said length being substantially shorter than the corresponding dimension of said second portion, at least said first portion being made of a substance having piezoelectric properties and being polarized in a direction substantially parallel to said length; at least one conductive grid being embedded in said homogeneous body at said interface and at least another electrode in contact with said body; said grid having meshes the longest dimension of which does not exceed a few tenths of a millimeter.

6. A longitudinally responsive piezoelectric transducer device according to claim 5, in which said grid is made of platinum.

7. A piezoelectric transducer device adapted to produce longitudinal vibrations, comprising a homogeneous elongated body including along its length first and second portions joining at a transverse interface, the dimension of said first portion parallel to said length being substantially shorter than the corresponding dimension of said second portion, at least said first portion being made of a substance having piezoelectric properties and being polarized in a direction substantially parallel to said length; a first conductive grid being embedded in said homogeneous body at said interface; second and third conductive grids substantially parallel to said first grid, being embedded in said first portion.

8. A piezoelectric transducer device adapted to produce longitudinal vibrations, comprising a homogeneous elongated body including along its length first and second portions joining at a transverse interface, the dimension of said first portion parallel to said length being substantially shorter than the corresponding dimension of said second portion, at least said first portion being made of a substance having piezoelectric properties and being polarized in a direction substantially parallel to said length; a conductive grid being embedded in said body at said interface and having a central aperture; the end of said first portion opposite to said grid being metallized opposite said aperture.

9. A longitudinally-responsive piezoelectric transducer device comprising: a thin longitudinal portion of piezoelectric substance having first and second end faces, a metallization on said first face and an electrically conductive grid on said second face; a film of polyvinyl chloride on said metallization; a first block of a ceramic substance adapted to damp pressure waves integrally connected to said thin portion and joining the same at said grid, and a second block of a substance adapted to absorb pressure waves integrally connected to said first block.

10. A piezoelectric transducer device comprising a homogeneous elongated body including along its length first and second portions joining at a transverse interface, the dimension of said first portion parallel to said length being substantially shorter than the corresponding dimension of said second portion, at least said first portion being made of a substance having piezoelectric properties and being polarized in a direction substantially parallel to said length; at least one conductive grid being embedded in said homogeneous body at said interface, and another electrode being disposed on the outer surface of said first portion, said grid and said electrode being adapted to carry electric signal potentials corresponding to an electric signal field substantially parallel to said length in said first portion and substantially nil in said second portion.

References Cited in the file of this patent

UNITED STATES PATENTS

| 1,899,503 | Hansell | Feb. 28, 1933 |
| 1,958,014 | Nicolson | May 8, 1934 |
| 2,323,030 | Gruetzmacher | June 20, 1943 |
| 2,841,722 | Graveley | July 1, 1958 |

FOREIGN PATENTS

| 1,003,203 | France | Nov. 14, 1951 |